United States Patent

[11] 3,588,715

[72] Inventor Takao Matsushima
Tokyo, Japan
[21] Appl. No. 793,095
[22] Filed Jan. 22, 1969
[45] Patented June 28, 1971
[73] Assignee Nippon Electric Company, Limited
Tokyo, Japan
[32] Priority Jan. 24, 1968
[33] Japan
[31] 43/3719

[54] REGENERATIVE REPEATERED TRANSMISSION APPARATUS

5 Claims, 5 Drawing Figs.

[52] U.S. Cl. .................................................... 328/164, 328/53
[51] Int. Cl. .................................................... H03k 5/156
[50] Field of Search ............................................ 328/164

[56] References Cited

UNITED STATES PATENTS

| | | | |
|---|---|---|---|
| 3,071,733 | 1/1963 | Holzer | 328/164 |
| 3,105,194 | 9/1963 | Rappeport | 328/164 |
| 3,213,378 | 10/1965 | Neeteson | 328/164 |
| 3,261,986 | 7/1966 | Kawashima et al. | 328/164 |

*Primary Examiner*—Donald D. Forrer
*Assistant Examiner*—Harold A. Dixon
*Attorney*—Marn and Jangarathis

ABSTRACT: Regenerative repeatered transmission apparatus is provided according to this invention wherein the repeater means present therein may be substantially reduced in size, cost and power consumption due to the collective elimination of accumulated jitter induced in a series of such repeater means and the adoption of a code format which does not require a timing function in each of the repeater means present therein. According to one embodiment of the present invention, the waveform transmitted through the transmission path of the regenerative repeatered transmission apparatus is unipolar in form and takes one of two discrete values alternately for each selected code bit of the original pulse codes. Upon receipt of the unipolar waveform at a given repeater means, the input waveform is shaped into a bipolar waveform, discriminated and regenerated without the need for timing or the complex circuitry required therefor. The cumulative jitter present in the repeatedly regenerated unipolar waveform is collectively removed by jitter compression means inserted in said regenerative repeatered transmission apparatus after each N repeater means.

Figure 1:
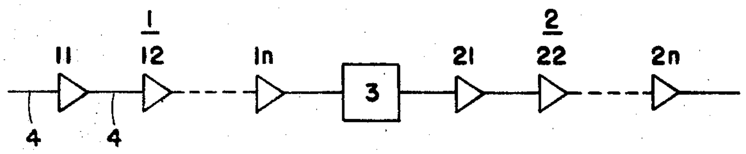

*INVENTOR.*
Takao Matsushima
*BY*
Marn & Jangarathis
ATTORNEYS

REGENERATIVE REPEATERED TRANSMISSION APPARATUS

This invention relates to transmission apparatus and more particularly to regenerative repeatered transmission apparatus for use in PCM transmission systems.

Present day regenerative repeatered transmission apparatus for use in PCM transmission systems generally comprise one or more PCM information paths having a plurality of regenerative repeater means spaced therealong at predetermined intervals. The PCM information paths may take the form of transmission lines, space through which radiant energy will propagate, or combinations of each of the aforementioned media. The precise form of the plurality of regenerative repeater means therein will vary depending upon the type of information path relied upon, while the spacing between such regenerative repeater means will be governed by the design criteria of the transmission apparatus and the characteristics of the PCM transmission system under consideration.

In the design of conventional regenerative repeatered transmission apparatus for use in PCM transmission systems, the error rate and the jitter present in the coded information are generally regarded a the most dominant factors to be considered in determining the deign criteria to be adopted. Furthermore, when the regenerative repeatered transmission apparatus under design includes a plurality of pairs of symmetrical transmission lines, as in cases where voice cables are employed as the system transmission lines, the interference induced therein due to near-end and far-end crosstalk between each of the typical cable pairs is generally determinative of the error rate and the jitter to be considered. Thus, in the design of such conventional transmission apparatus, a specified value of error rate, which will be strongly influenced by the number of channels utilized in conjunction with a given line, is satisfied by selecting the spacing between the sequentially positioned repeater means in accordance with the amount of near-end and/or far-end multiple crosstalk. In addition, as it is well known that marked improvements in the signal-to-crosstalk power ratio can be achieved by the utilization of bipolar, as distinguished from unipolar pulse waveforms, bipolar code formats are generally adopted for use in conjunction with such conventional transmission apparatus as disclosed in an article entitled "A Bipolar Repeater for Pulse Code Modulation Signals" by J. S. Mayo and published in the Bell System Technical Journal, Vol. 21, No. 1, Jan. 1962, at pages 25—98. In regard to the jitter present in such coded information, while it does not serve directly in arriving at the desired design criteria, it has been found that so long as the signal-to-crosstalk power ratio is sufficient to maintain the overall error rate of the conventional regenerative repeatered transmission apparatus below $10^{16}$, the jitter will not become excessively disruptive.

Conventional repeater means utilized in present day regenerative repeatered transmission apparatus generally provides three basic roles therein in carrying out the functions of reshaping, retiming and regeneration. However, due to the nature of PCM information, repeater means utilized in PCM transmission systems are substantially more complex in structure and require more active elements therein than do the repeater means relied upon, for instance, in frequency division multiplex transmission systems. Furthermore, because PCM transmission systems require a broader transmission bandwidth for coding than do frequency division multiplex transmission systems, such PCM transmission systems manifest a higher transmission path loss per unit length at the highest frequencies in the transmission band thereof and hence require closer spacing between the repeater means present in the regenerative repeatered transmission apparatus thereof. Thus, as the spacing between the repeater means present in the regenerative repeatered transmission apparatus of a PCM system must be closer than that necessary in a frequency division multiplex system, it will be seen that more repeater means are required in a PCM system than in a frequency division multiplex system which renders the former system substantially more expensive than the latter. Furthermore, the practical disadvantage of the need for additional apparatus for retiming and/or regeneration in PCM systems is further compounded by the complex structural forms of the repeater means required thereby because such complex configurations render miniaturization of the repeater means difficult and hence it is inconvenient to mount intermediate repeater means on outside poles or in manholes as in the common practice in other transmission systems. In addition, repeater means which are complex in structure and include a large number of active devices therein are difficult and inconvenient to energize from remote locations due to the relatively large power consumption thereof. Thus, it will be appreciated that present day regenerative repeatered transmission apparatus for use in PCM transmission systems have a plurality of practical disadvantages which attach thereto to render them unattractive from a commercial standpoint despite the inherent attributes of PCM transmission in general.

Therefore, it is an object of this invention to provide regenerative repeatered transmission apparatus for a PCM transmission system wherein the individual repeater means present therein are structurally simplified and substantially reduced in size and power consumption whereby the resulting repeatered transmission apparatus for such a PCM transmission system is commercially competitive with that used in other known transmission systems and the repeater means utilized therewith may be mounted and supplied with power in the conventional manner. Other objects and advantages of this invention will become clear from the following detailed description of an embodiment thereof, and the novel features will be particularly pointed out in conjunction with the appended claims.

Figure 3:
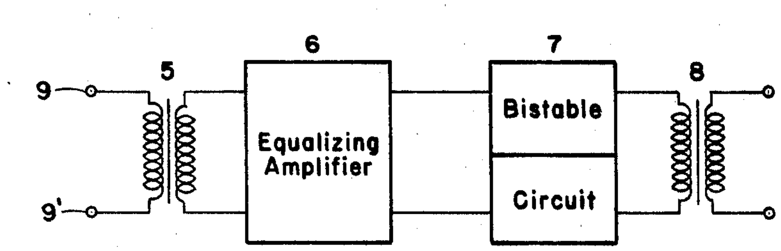

In accordance with this invention, regenerative repeatered transmission apparatus for a PCM transmission system is provided wherein the individual repeater means present therein are structurally simplified to thus allow a substantial reduction in the size and power consumption thereof by the adoption therein of a code format which enables such structural simplification and by the collective elimination of the accumulated jitter induced by a series of said repeater means without a retiming feature while each repeater means is permitted to jitter within a predetermined allowable limit. The invention will be more clearly understood by reference to the following detailed description of an exemplary embodiment thereof in conjunction with the accompanying drawings in which:

FIG. 1 diagrammatically illustrates an embodiment of the regenerative repeatered transmission apparatus according to the present invention;

FIGS. *2a—2c* graphically represent the waveforms of signals transmitted and received at each site of the repeater means present in the FIG. 1 embodiment of the regenerative repeatered transmission apparatus according to this invention; and FIG. 3 schematically illustrates repeater means suitable for use in the FIG. 1 embodiment of the present invention.

Referring now to the drawings and more particularly to FIG. 1 thereof, there is shown an exemplary embodiment of the regenerative repeatered transmission apparatus for a PCM transmission system in accordance with the teachings of the present invention. As shown in FIG. 1, the illustrated embodiment of the regenerative repeatered transmission apparatus, a portion of which is shown in FIG. 1, comprises a plurality of groups of repeater means 1 and 2 spaced along a transmission path 4 and separated by the additional repeater means 3. Each of the illustrated groups of repeater means 1 and 2, includes a plurality of simple repeater means 11, 12,...1N and 21, 22,...2N, respectively, which perform only the functions of shaping and regeneration and hence do not require the complex timing extraction circuitry necessary for performing a timing function. The simple repeater means 11, 12,...1N and 21, 22,...2N are each spaced along the transmission path 4, which may take the form of a transmission line, and every N simple repeater means, forming one of said plurality of groups, is separated by an additional repeater means 3 connected into the transmission path 4 as shown. The additional repeater means 3 includes, in addition to the shaping and regeneration functions present in the simple repeater means 11, 12,...1N and 21, 22,...2N, the well known circuitry necessary for jitter reduction and accordingly may comprise any of the well known class of jitter compressor means presently available. Examples of such jitter compressor means are disclosed in an article entitled "Experimental 224 Mb/s PCM Terminal" by J. S. Mayo and in an article entitled "An Experimental 224Mb/s Digital Multiplexer-Demultiplexer Using Pulse Stuffing Synchronization" by F. J. Witt as published in the Bell System Technical Journal, Vol. 24, No. 9, Nov. 1965, at pages 1813-—1842 and 1843—1886, respectively.

Figure 2A:
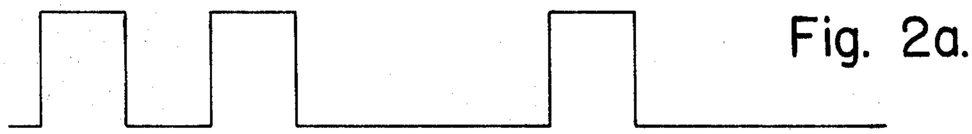
Figure 2B:
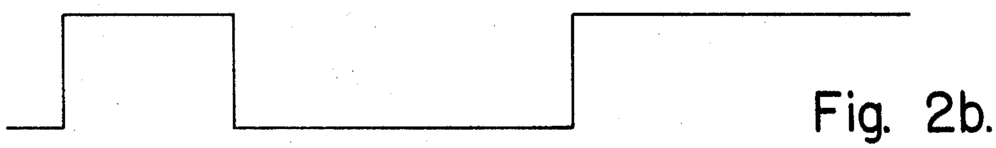

Although a detailed description of the operation of the embodiment of the regenerative repeatered apparatus depicted in FIG. 1 will be given in connection with 1886, waveforms illustrated in FIGS. 2*a*—2*c*, it should be initially noted that in contradistinction to the previously described bipolar waveforms relied upon in PCM transmission apparatus according to the prior art, a unipolar waveform is relied upon for transmission in the FIG. 1 embodiment of the present invention. Thus, as aforesaid, since each of the simple repeater means 11, 12,...1N and 21, 22,...2N provide only shaping and regeneration functions, the unipolar waveform which is attenuated as it propagates down the transmission path 4 is, at each repeater means 11, 12,...1N and 21, 22,...2N, amplified and shaped and thereafter applied to the discriminator portion of such repeater means where the shaped input signal is compared to a threshold level to determine the presence or absence of information pulses. The information pulses thus detected in each repeater means 11, 12,...1N and 21, 22,...2N are then regenerated by the regenerative circuit position of such repeater means and subsequently retransmitted to the transmission path 4, again in the form of unipolar pulses, for application to the next repeater means in the sequence. Furthermore, despite the use of a unipolar waveform in the embodiment of the regenerative repeatered transmission apparatus depicted in FIG. 1, the marked improvement of the signal-to-crosstalk power ratio achieved by using a bipolar code format is here retained because, as shall be seen hereinafter, the shaping function of each of said repeater means 11, 12,...1N and 21, 22,...2N transforms the unipolar waveform of the input signals into a bipolar waveform whereby the lessened effects of a bipolar waveform on the amplifier means due to near-end crosstalk are retained.

The operation of the FIG. 1 embodiment of the present invention will now be described in conjunction with FIGS. 2*a*—2*c*. FIG. 2*a* shows an example of the original code, 11010, while FIG. 2*b* shows the waveform transmitted by each of the repeater means 11, 12,...., 1N and 21, 22,...., 2N and FIG. 2*c* shows the waveform received and shaped by each of said repeater means 11, 12,...., 1N and 21, 22,....,2N. According to this invention, as distinguished from the bipolar code format employed by the conventional repeater means, the output portion of each of the simple repeater means 11, 12,...., 1N and 21, 22,...., 2N comprises circuit means such as a multivibrator, which is capable of assuming only two discrete states of voltage or current, and generates the output which assumes either of the two discrete states alternately each time the original code 1 occurs. Accordingly, when the original code format is 11010, as shown in FIG. 2*a*, the output pulse of the given repeater means, as shown in FIG. 2*b*, assumes a 1 value for the pulse in the first time-slot of the original code format, assumes a 0 value for the pulse in the second time-slot, maintains a 0 value for the 0 in the third time-slot, and assumes a 1 for the 1 in the fourth time-slot. Therefore, it will be seen that the state of the output portion of each of the repeater means 11, 12,...1N and 21, 22,...2N changes alternately and assumes one of two values each time a pulse of a given value, as present in the original code format, occurs. Thus, in the described case, the state of the output portion of the given repeater means changed each time a 1 code bit was detached; however, as will be readily appreciated by those of ordinary skill in the art, such output portions of the repeater means 11, 12,...1N and 21, 22,...2N could be similarly responsive to the presence of zeros (0) in the original code format as a complement to 1.

As mentioned above, since the unipolar input code format received by each of the repeater means 11, 12,...1N and 21, 22,...2N is attenuated and distorted by the loss characteristics of transmission path 4, and the input code format is initially amplified and shaped prior to the application thereof to the output circuit portions of such repeater means. Furthermore, as aforesaid, since the shaping function of each of said repeater means 11, 12,...1N and 21, 22,...2N transforms the attenuated and distorted unipolar waveform of the received signals, into a bipolar waveform, the lessened effects of a bipolar waveform the performance deterioration of the repeater means due to near-end crosstalk is retained. The input portion of each of the repeater means 11, 12,...1N and 21, 22,...2N, may take the form of equalizing amplifier means or any other suitable form of circuit means, capable of amplifying and shaping a unipolar input code waveform as if it was a conventional bipolar code waveform. Thus, if it is again assumed that the unipolar waveform of FIG. 2*b* is transmitted through transmission path 4 and received by a given one of said repeater means 11, 12,...1N and 21, 22,...2N, the unipolar code format of 11010 thereof will be transformed into the bipolar code format of 1—1010, obtained by replacing the second 1 of the unipolar pulse waveform with a —l as is illustrated in FIG. 2*c*. As shown in FIG. 2*c*, the waveform of the bipolar pulse train provided by the output of the input portion of said given repeater means is shaped in a finite band in order to equalize the attenuation distortion caused by the transmission path 4 loss characteristics and is rendered blunt as indicated. Thus each turning point from one of the two values of the output of the given repeater means to the other, as shown in FIG. 2*b*, corresponds to a maximum or minimum point of the received waveform after it is shaped as shown in FIG. 2*c*. However, as will be readily understood by those of ordinary skill in the art, this relationship will not always obtain in practice due to time delays introduced by the transmission path 4 and the repeater means 11, 12,...1N and 21, 22,...2N.

Figure 2C:
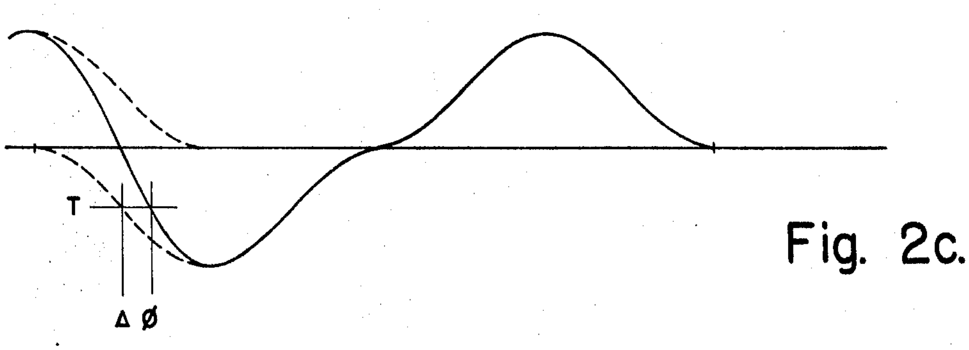

The waveform shown in FIG. 2*c*, as previously stated, is a graphical representation of the attenuated and distorted unipolar input code format received by a given one of said repeater means 11, 12,...1N and 21, 22,...2N after appropriate amplification and shaping has been applied thereto by the input circuit portion of said given repeater means. Generally, it is required, as a necessary prerequisite to the proper shaping of the received input waveform, that the shaped waveform produced not spread so widely as to apply residual signals to the preceding or succeeding time slots so that the original signal present in these adjacent time slots will not be disturbed. Further, proper shaping additionally requires that the resultant bandwidth of the shaped wave be as narrow as possible so that the attenuation in the high frequency region, where the crosstalk characteristic of the line is poor, can be made as high as possible. The foregoing requirements tend to dictate contrary design criteria, in practical repeater means for use in the exemplary embodiment of this invention, as depicted in FIG. 1. The form of the shaped waveform will vary depending upon whether the preceding and succeeding pulse codes are 1's or 0's. These shapes of the resultant waveform are indicated in FIG. 2*c* where the solid curve represents the case of a 110 code sequence, while the dashed curves represent cases of a 010 (lower) or 100 (upper) code sequence.

The received and shaped bipolar waveform is then compared within said given repeater means with a threshold level so that a determination of the presence of code pulses is made and the output, regenerative portion of said given repeater means may be actuated in response to the presence of said code pulses, in the manner described above. However, as the time when a given code pulse is regenerated will vary according to the particular code pattern present in the shaped waveform of FIG. 2*c*, thereby resulting in so called jitter, it will be seen that the time for regeneration of a given code pulse will vary depending upon the code pulse which precedes such given pulse. Thus, if the second bit code pulse 1 of the first three bit pulse code 110, represented by the solid curve, and the second bit code pulse 1 of the three bit pulse code 010, represented by the dashed curve, are considered it will be seen that a phase variation resides between such curves equal to $\Delta\Phi$. Accordingly, the time of regeneration of the second bit code pulses mentioned above and hence the jitter present therefrom will be seen to depend upon and vary with the nature of the preceding code pulse. Therefore, the jitter present in any of the repeater means 11, 12,...1N and 21, 22,...2N will vary in accordance with the nature of the shaped waveform regenerated thereby.

In conventional repeater means, timing is generally accomplished by extraction of the timing signal from the received code format after shaping has occurred so that the jitter of the output waveform is maintained at a relatively low level as long as there is no phase variation present in the timing signal itself. In the regenerative repeatered transmission apparatus according to this invention, however, the amount of jitter occurring in each of the repeater means 11, 12,...1N and 21, 22,...2N, depicted in the FIG. 1 embodiment, will depend upon the shaping characteristic of each of the repeater means, the nature of the attenuated and distorted unipolar input code format upon which the shaping characteristic acts, and the degree of isolation which attaches to the shaped waveform whereby the greater the degree of isolation of the shaped waveform, the smaller the jitter becomes, the more the bandwidth is needed. On the other hand, the amount of crosstalk present will increase due to the expansion of the transmission frequency band and further, the jitter occurring in the individual repeater means within a repeater group 1 or 2 will be cumulative due to the multiple regeneration along the transmission path 4 producing, as a secondary result, an increase in the intersymbol interference. Therefore, there exists an inherent limit to the amount of jitter allowable in an individual repeater means present in the regenerative repeatered transmission apparatus according to the present invention. This inherent limit, it has been found, may be readily satisfied by keeping the pulse width at the half level of the peak amplitude of the isolated, equalized code pulse less than 0.7 of the repetition period of the code pulse waveform.

Although it is possible to reduce the jitter present in each of the individual repeater means 11, 12,...1N and 21, 22,...2N present in the embodiment of the invention depicted in FIG. 1, by maintaining the pulse width at the half level of the peak amplitude of the received shaped code pulse at a value less than 0.7 of the repetition period of the code pulse waveform, it is also necessary to compensate for the cumulative effect of the jitter present in each of said individual repeater means 11, 12,...1N and 21, 22,...2N as the unipolar code waveform propagates down the transmission path 4 and is periodically regenerated. This compensation is here necessary because if jittered signals are directly decoded at the receiving end of the transmission path 4, noise resulting from the phase modulation thereof will occur and hence a degradation in the signal-to-noise ratio of the system will obtain. To avoid the deleterious consequences of the cumulative effects of jitter in each of the repeater means 11, 12,...1N and 21, 22,...2N, as shown in FIG. 1, the additional repeater means 3, in the form of a jitter compressor, is inserted every N simple repeater means to thus divide the repeater means 11, 12,...1N and 21, 22,...2N into groups of repeater means 1 and 2, whereby the cumulative effects of jitter present in each of the individual repeater means 11, 12,...1N and 21, 22,...2N is compensated every N repeaters. Thus it will be seen that the embodiment of the regenerative repeatered transmission apparatus depicted in FIG. 1 relies upon a novel unipolar code format to enable the utilization of simplified repeater means therein which do not include the timing function and hence the complex timing extraction circuitry generally found in PCM regenerative repeatered transmission apparatus.

An exemplary embodiment of repeater means suitable for use in the embodiment of this invention illustrated in FIG. 1 is shown in FIG. 3. As shown in FIG. 3, the exemplary embodiment of the simplified repeater means comprises input transformer means 5, equalizing amplifier means 6, bistable circuit means 7 and output transformer means 8 wherein each of the aforementioned circuit elements are serially connected together in the order named. In operation, a unipolar code waveform such as that shown in FIG. 2*b* is transmitted over the transmission path 4 and is thus received at the input terminals 9–9′ of the input transformer means 5. The unipolar input code waveform thus received is applied by the input transformer means 5 to the equalizing amplifier means 6 whereat said input code waveform is amplified and shaped in the manner previously described. The output signal of the equalizing amplifier means 6, which consists of bipolar pulses having positive and negative polarities as shown in FIG. 2*c*, is applied to the bistable circuit means 7. The bistable circuit means 7 in response to the bipolar output signal of the equalizing amplifier means 6 is alternatively switched between two stable states each time the positive and negative portions of the bipolar output signal of the equalizing amplifier means 6 exceed the settled positive and negative threshold levels thereof, respectively. The output of the bistable circuit means which takes the form of the waveform illustrated in FIG. 2*b* is then applied to the output transformer means 8 whereupon the thus regenerated unipolar code format is returned to the transmission path 4.

From the foregoing description of the exemplary embodiment of the regenerative repeatered transmission apparatus according to the present invention, it will be readily apparent, to those of ordinary skill in the art, that much simpler repeater means may be utilized therein than those required by conventional transmission apparatus adopting a bipolar code format and hence requiring complex timing extraction circuitry. These advantageous results here obtain because the waveform transmitted through the transmission path is unipolar in form and takes one of two discrete values alternately for each designated code bit of the original pulse codes. Furthermore, upon receipt of such unipolar waveform at a given repeater means, the input waveform is merely shaped into bipolar pulses whose half-value width is less than 0.7 of the repetition period, discriminated and regenerated without the need for timing or the complex circuitry required thereby. Therefore, it will be seen that although the regenerative repeatered transmission apparatus according to use in the present invention requires more repeater means for use in a PCM transmission system than do transmission apparatus for a frequency division multiplex system, the repeater means utilized herein are so substantially simplified over those generally relied upon in prior art regenerative repeatered transmission apparatus that their greater number is easily justified by their substantially reduced cost and power requirements. Furthermore, as the repeater means utilized in the instant invention do not require complex timing extraction circuitry, they are structurally simplified and hence readily admit of miniaturization whereupon they can conveniently be mounted on poles or in manholes and remotely powered. In addition, as only one jitter compressor means is required for every N simple repeater means, the costs thereof will not become oppressive and these relatively large repeater means can be conveniently installed in a building, for instance a telephone office.

While the invention has been described in connection with an exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

I claim:

1. Regenerative repeater apparatus for a pulse code modulation transmission system, comprising:

a plurality of pulse code regenerative repeaters spaced in tandem in a signal transmission line for receiving a train of unipolar pulse code modulation pulses substantially free from phase jitter and regenerating successive trains of other unipolar pulse code modulation pulses therefrom; each repeater means including input means for shaping said received unipolar pulse into bipolar pulses and output means for regenerating unipolar pulses from said bipolar pulses; whereby said input means of each of said repeater means introduces a phase difference between said bipolar pulses representing different bits occupying first and second positions in a particular code sequence of three 0 and 1 bits to cause phase jitter in said unipolar pulses regenerated from said phase difference bipolar pulses in such manner that the successive phase differences cause cumulative phase jitter in said regenerated unipolar pulse code modulation pulses as said last-mentioned pulses are propogated from a first to a last of said repeater means in said line; and phase jitter compensating means connected in said line after said last repeater means therein to compensate for said cumulative phase jitter in said unipolar pulses propagated from said output means in said last repeater means to said line, including:

means for shaping said unipolar pulse code modulation pulses having said cumulative phase jitter therein as received from said output means of said last repeater means into bipolar pulse code modulation pulses having therein phase jitter corresponding to said last-mentioned unipolar cumulative phase jitter and bistable circuit means repetitively activated alternately between two stable states in response to said bipolar pulse code modulation pulses having said corresponding cumulative phase jitter therein to regenerate a train of unipolar pulse code modulation pulses substantially free from phase jitter to represent said train of unipolar pulse code modulation pulses received at said input means of said first repeater means; said bistable circuit means also propagating said unipolar pulses regenerated therein to said line.

2. Regenerative repeater apparatus for a pulse code modulation transmission system, comprising:

a plurality of pulse code regenerative repeater means spaced in tandem in a signal transmission line for receiving a train of unipolar pulse code modulation pulses substantially free from phase jitter and regenerating successive trains of other pulse code modulation pulses therefrom; each repeater means including an input means for shaping said received unipolar pulse into bipolar pulses and output means for regenerating unipolar pulses from said bipolar pulses; whereby said input means of each of said repeater means introduces a phase difference between said bipolar pulses representing different bits occupying first and second positions in a particular code sequence of three 0 and 1 bits to cause phase jitter in said unipolar pulses regenerated from said phase difference bipolar pulses in such manner that the successive phase differences cause cumulative phase jitter in said regenerated unipolar pulse code modulation pulses as said last-mentioned pulses are propagated from a first to a last of said repeater means in said line; and phase jitter compensating means connected in said line after said last repeater means therein and responsive to said unipolar pulse code modulation pulses having said cumulative phase jitter therein as received from said last repeater means output means to regenerate a train of unipolar pulse code modulation pulses substantially free from phase jitter to represent said train of unipolar pulse code modulation pulses received at said input means of said first repeater means.

3. The apparatus according to claim 2 in which said phase jitter compensating means includes:

means for shaping said unipolar pulse code modulation pulses having said cumulative phase jitter therein as received from said output means of said last repeater means into bipolar pulse code modulation pulses having therein cumulative phase jitter corresponding to said last-mentioned unipolar pulse cumulative phase jitter; and bistable circuit means repetitively activated alternately between two stable states in response to said bipolar code modulation pulses having said cumulative phase jitter therein to regenerate a train of unipolar pulse code modulation pulses substantially free from phase jitter to represent said train of unipolar pulse code modulation pulses received at said input means of said first repeater means; said bistable circuit means also transmitting said last-mentioned regenerated unipolar pulse code modulation pulses to said line.

4. The apparatus according to claim 2 in which said phase jitter compensating means includes circuit means for shaping said unipolar pulse code modulation pulses having said cumulative phase jitter therein as received from said output means of said last repeater means into bipolar pulse code modulation pulses having therein cumulative phase jitter corresponding to said last-mentioned unipolar pulse cumulative phase jitter.

5. The apparatus according to claim 4 in which said phase jitter compensating means includes bistable circuit means repetitively activated alternately between two stable states in response to said bipolar pulse code modulation pulses having said corresponding cumulative phase jitter therein to regenerate a train of unipolar pulse code modulation pulses substantially free from phase jitter to represent said train of unipolar pulse code modulation pulses received at said input means of said first repeater means; said bistable circuit means also propagating said unipolar pulses regenerated thereby to said line.